United States Patent
Li et al.

(10) Patent No.: US 12,012,113 B2
(45) Date of Patent: Jun. 18, 2024

(54) VEHICLE-USER INTERACTION SYSTEM AND METHOD

(71) Applicant: Volvo Car Corporation, Gothenburg (SE)

(72) Inventors: Wei Li, Shanghai (CN); Zujie Fan, Shanghai (CN); Tong Li, Shanghai (CN)

(73) Assignee: Volvo Car Corporation, Gothenburg (SE)

( * ) Notice: Subject to any disclaimer, the term of this patent is extended or adjusted under 35 U.S.C. 154(b) by 33 days.

(21) Appl. No.: 17/880,712

(22) Filed: Aug. 4, 2022

(65) Prior Publication Data
US 2023/0049658 A1 Feb. 16, 2023

(30) Foreign Application Priority Data
Aug. 6, 2021 (CN) .......................... 202110901420.7

(51) Int. Cl.
*B60W 50/08* (2020.01)
*G06F 3/0482* (2013.01)
*G06F 3/04847* (2022.01)
*G06F 40/205* (2020.01)

(52) U.S. Cl.
CPC ......... *B60W 50/085* (2013.01); *G06F 3/0482* (2013.01); *G06F 3/04847* (2013.01); *G06F 40/205* (2020.01); *B60W 2540/215* (2020.02)

(58) Field of Classification Search
CPC ........... B60W 50/085; B60W 2540/215; G06F 3/0482; G06F 3/04847; G06F 40/205; G06F 11/3013; G06F 11/3058; G06F 9/451; G06F 9/4451
See application file for complete search history.

(56) References Cited

U.S. PATENT DOCUMENTS

| | | | |
|---|---|---|---|
| 7,774,593 B2 * | 8/2010 | Tamai | H04L 63/0428 713/160 |
| 9,536,197 B1 * | 1/2017 | Penilla | G06N 5/025 |
| 10,195,940 B2 * | 2/2019 | Pudar | G06F 16/285 |

(Continued)

OTHER PUBLICATIONS

Dec. 12, 2022 European Search Report issued in corresponding International Application No. 22188781.

*Primary Examiner* — Hien L Duong
(74) *Attorney, Agent, or Firm* — Clements Bernard Walker; Christopher L. Bernard

(57) ABSTRACT

A vehicle-user interaction system for a vehicle includes: an editor configured to receive one or more inputs from a user of the vehicle and edit the one or more inputs into a rule script, the rule script including a user-defined rule based on the one or more inputs, the user-defined rule defining a trigger condition and a vehicle operation performed when the trigger condition is satisfied; a parser configured to create a list of monitoring elements and a list of functional elements based on the rule script, the list of monitoring elements including sensor elements that directly or indirectly describe the trigger condition, and the list of functional elements including functional elements that are associated with the vehicle operation; and an actuator configured to monitor sensor detection information associated with the sensor elements, determine whether the trigger condition is satisfied, and execute the functional elements to implement the user-defined rule in the vehicle.

16 Claims, 7 Drawing Sheets

(56) References Cited

U.S. PATENT DOCUMENTS

| | | | |
|---|---|---|---|
| 11,305,651 B2* | 4/2022 | Powell | G06V 20/593 |
| 11,602,991 B2* | 3/2023 | Bongard | G06F 3/04886 |
| 2009/0079555 A1* | 3/2009 | Aguirre De Carcer | G07C 5/008 |
| | | | 701/2 |
| 2009/0125459 A1 | 5/2009 | Norton et al. | |
| 2013/0124009 A1* | 5/2013 | Esler | H04L 67/303 |
| | | | 701/1 |
| 2014/0310075 A1* | 10/2014 | Ricci | B60W 50/085 |
| | | | 705/13 |
| 2015/0217777 A1* | 8/2015 | Konigsberg | B60K 35/00 |
| | | | 701/36 |
| 2015/0256580 A1* | 9/2015 | Morton | H04L 12/28 |
| | | | 709/219 |
| 2017/0072794 A1* | 3/2017 | Buttolo | G06F 3/04842 |
| 2019/0135311 A1* | 5/2019 | Zarella | B61L 15/0072 |
| 2019/0176624 A1 | 6/2019 | Powell et al. | |
| 2020/0139471 A1* | 5/2020 | Pliska | B23K 9/0953 |
| 2020/0310733 A1* | 10/2020 | Fujimura | G06F 3/04883 |
| 2020/0391576 A1* | 12/2020 | Ostrowski | B60J 1/002 |

\* cited by examiner

VEHICLE-USER INTERACTION SYSTEM
AND METHOD

CROSS-REFERENCE TO RELATED
APPLICATION

The present application claims the benefit of priority of co-pending Chinese Patent Application No. CN 202110901420.7, filed on Aug. 6, 2021, and entitled "VEHICLE-USER INTERACTION SYSTEM AND METHOD," the contents of which are incorporated in full by reference herein.

TECHNICAL FILED

The disclosure relates to a vehicle-user interaction system and a vehicle-user interaction method. The disclosure also relates to a corresponding machine-readable storage medium.

BACKGROUND

In the field of automotive technology, in addition to the two major issues of safety and comfort, more and more attention is paid to user experience (UX). In order to provide a better UX, the ongoing research focuses on human-machine interaction technologies and can deliver basic interaction functions between a vehicle and a user of the vehicle, for example, the user can learn vehicle status information and road condition information from an HMI of the vehicle, and also can activate vehicle functions such as cruise control, self-driving in high-way, and automatic parking by interacting with the HMI. There is increased expectation that the vehicle should provide customized services for the user.

SUMMARY

According to an embodiment of the disclosure, a vehicle-user interaction system for a vehicle is provided. The system includes: an editor configured to receive one or more inputs from a user of the vehicle and edit the one or more inputs into a rule script, the rule script including a user-defined rule based on the one or more inputs, the user-defined rule defining a trigger condition and a vehicle operation performed when the trigger condition is satisfied; a parser configured to create a list of monitoring elements and a list of functional elements based on the rule script, the list of monitoring elements including sensor elements that directly or indirectly describe the trigger condition, and the list of functional elements including functional elements that are associated with the vehicle operation; and an actuator configured to monitor sensor detection information associated with the sensor elements, determine whether the trigger condition is satisfied based on the monitored sensor detection information, and execute the functional elements to implement the user-defined rule in the vehicle if it is determined the trigger condition is satisfied.

According to another embodiment of the disclosure, a vehicle-user interaction method for a vehicle is provided. The method includes: receiving, at an editor, one or more inputs from a user of the vehicle; editing, at the editor, the one or more inputs into a rule script, the rule script including a user-defined rule based on the one or more inputs, the user-defined rule defining a trigger condition and a vehicle operation performed when the trigger condition is satisfied; creating, at a parser and based on the rule script, a list of monitoring elements and a list of functional elements, the list of monitoring elements including sensor elements that directly or indirectly describe the trigger condition, and the list of functional elements including functional elements that are associated with the vehicle operation; monitoring, at an actuator, sensor detection information associated with the sensor elements; determining, at the actuator and based on the monitored sensor detection information, whether the trigger condition is satisfied; and executing, at the actuator, the functional elements to implement the user-defined rule in the vehicle if it is determined the trigger condition is satisfied.

BRIEF DESCRIPTION OF THE DRAWINGS

The disclosed aspects will hereinafter be described in connection with the appended drawings that are provided to illustrate but not to limit the scope of the Disclosure.

DETAILED DESCRIPTION

Examples of the disclosure relate to vehicle-user interaction systems and methods, which are implemented based on an on-board system having an Android operating system such as AAOS (Android Automotive Operation System). Using the vehicle-user interaction systems and methods, a user can program his/her vehicle. For example, the user can edit a custom rule on one or more of a mobile phone, a web page, and an on-board unit (OBU). Then, the rule is synchronized to the on-board system (e.g., the infotainment system of the vehicle). Then, the rule is executed at the on-board system. In this way, the custom rule can be edited inside or outside the vehicle, and then executed inside the vehicle. This allows the vehicle to provide customized services.

According to embodiments of the disclosure, on one hand, the user is provided with a visual programming platform such that the user can program the rule on the platform, and on the other hand, the content of the rule that the user can program is controlled. Specifically, the content that the user can input to the visual programming platform is limited due to the consideration of vehicle safety. In this way, the vehicle can provide user-customized services while ensuring vehicle safety, and to a certain extent, customizing a vehicle from the perspective of user experience is realized.

Embodiments of the disclosure will be described below in connection with the drawings.

Figure 1:
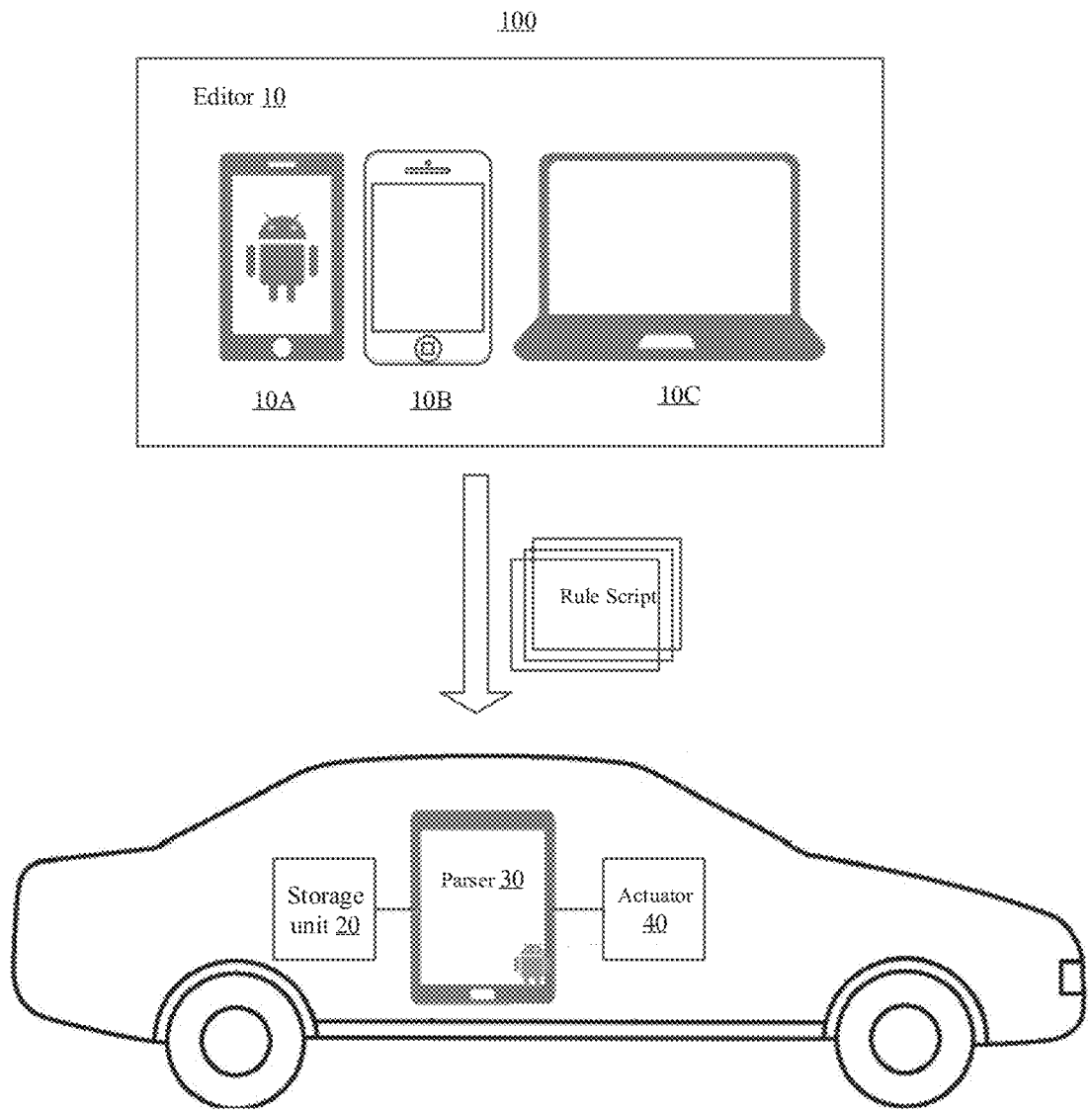
FIG. 1 is a schematic diagram of a vehicle-user interaction system according to an embodiment of the disclosure.

FIG. 1 schematically illustrates a vehicle-user interaction system 100 for a vehicle V according to an embodiment of the disclosure. The vehicle-user interaction system 100 includes an editor 10, a storage unit 20, a parser 30, and an actuator 40.

The editor 10 is provided in at least one of an electronic device of the user and an infotainment system of the vehicle V. The operating system of the electronic device can be either an Android operating system or an IOS operating system (see 10A, 10B, 10C in FIG. 1). That is to say, the editing process can be performed on an electronic device having an Android operating system or an Apple iOS operating system. The electronic device, for example, includes one or more of an Android phone, an Apple phone, a laptop computer, an Android or Apple tablet, an Android or Apple wearable device (such as i-watch), and a desktop computer.

In some examples, the editor 10 includes one or more editors disposed at one or more of the electronic devices and the infotainment system. For example, the editor 10 is implemented as software (e.g., an APP), and the software is disposed in the mobile phone, the tablet, the wearable device, the laptop computer, and the desktop computer. In this way, the user can edit a custom rule on one or more of an APP, a web page, and an OBU (on-board unit).

It is noted that the electronic device refers to an electronic device that is not part of the vehicle V. The physical position of the electronic device is not limited. The electronic device can be within the vehicle V, for example, the electronic device such as a smartphone is carried by the user who is inside the vehicle V. The position of the electronic device also can be outside the vehicle, for example, the electronic device such as a smartphone is carried by the user who is outside the vehicle V.

The editor 10 receives one or more inputs from the user and edits the inputs into a rule script that includes a user-defined rule. The user-defined rule includes a trigger condition and a vehicle operation that will be performed if the trigger condition is satisfied. In an example, the trigger condition includes environment information and/or vehicle status information, and the vehicle operation includes vehicle functions that will be activated if the trigger condition is met. For example, a user-defined rule could be "if an ambient temperature is above 26° C., close vehicle windows and turn on air conditioning".

It is noted that, as described above, personalization and customization can be realized for individual users; however, the content of the personalization and customization is controlled due to vehicle safety concerns, that is to say, the user is not allowed to program any rule as he or she wishes, which is due to the consideration of vehicle safety.

The storage unit 20 is provided in the infotainment system of the vehicle V for storing the rule script which has been edited at the editor. The edited rule script is transmitted to the storage unit 20 via a wired or wireless communication link. In an example, the edited rule script is directly transmitted to the storage unit 20 through a near-field communication link. In another example, the edited rule script is uploaded to a cloud server and then transferred to the storage unit 20 from the cloud server.

The parser 30 is provided in the infotainment system. The parser 30 acquires the edited rule script from the storage unit 20 and creates a list of monitoring elements and a list of functional elements based on the acquired rule script. The list of monitoring elements includes sensor elements for directly and/or indirectly sensing the trigger condition. The list of functional elements includes functional elements for executing the vehicle operation.

The actuator 40 is provided in the infotainment system. The actuator 40 monitors sensor detection information associated with the sensor elements. For example, if the trigger condition includes an ambient temperature, the corresponding sensor detection information may include detected ambient temperature information and/or other detected information based on which the ambient temperature can be calculated. The actuator 40 determines whether the trigger condition is satisfied based on the sensor detection information. If it is determined the trigger condition is satisfied, the actuator 40 executes corresponding functional elements to implement the user-defined rule in the vehicle V such as turning on air conditioning and closing the windows.

In some examples, each of the editor 10, the parser 30, and the actuator 40 is each implemented as an individual software module that communicates with each other. In another example, the editor 10, the parser 30, and the actuator 40 are combined together to form one integrated software module.

In some examples, the editor 10, the parser 30, and the actuator 40 are all be provided in the infotainment system of the vehicle V.

In some examples, the editor 10 includes two or more editors provided in the infotainment system and the electronic device respectively. The parser 30 is provided in the infotainment system, and the actuator 40 is provided in the infotainment system.

In some examples, the operating system of the infotainment system is the Android Automotive OS, i.e., Android Automotive Operation System (AAOS).

Figure 2A:
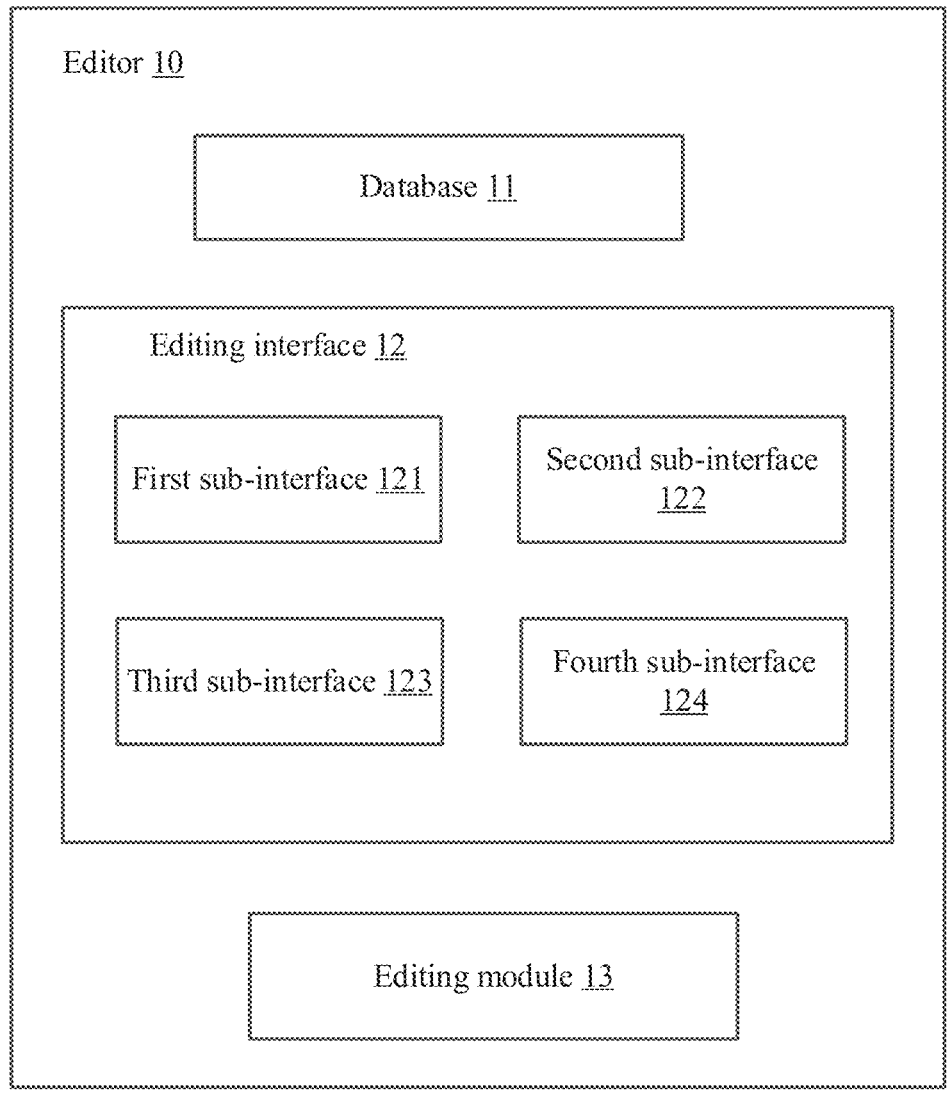
FIGS. 2A-2C are schematic block diagrams of implementations of an editor, a parser, and an executor, respectively, of the vehicle-user interaction system of FIG. 1.
Figure 2B:
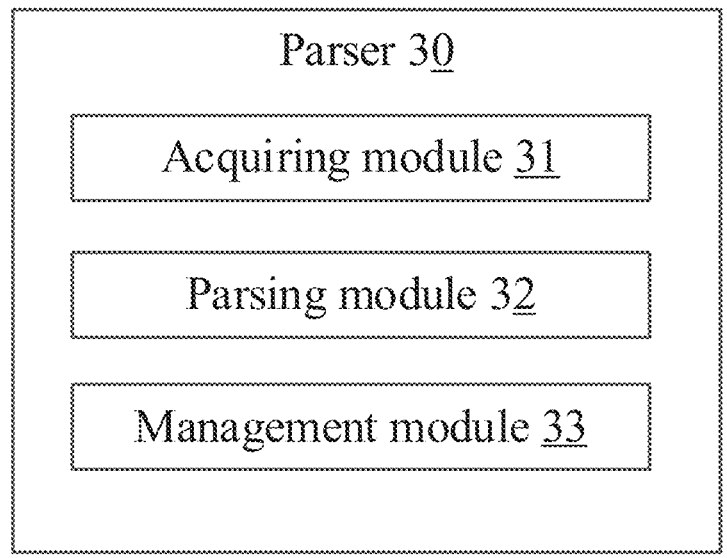
Figure 2C:
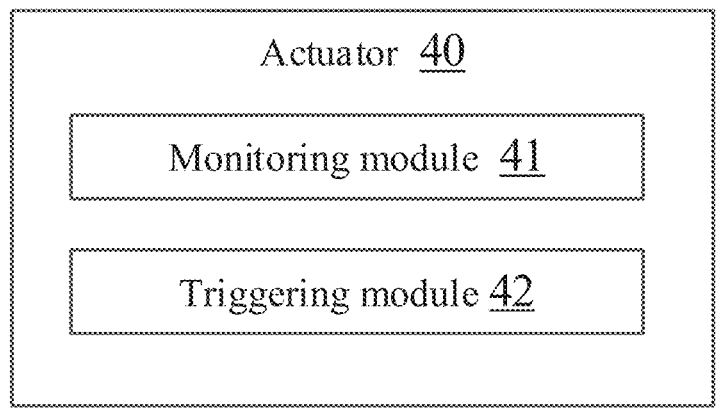

FIGS. 2A-2C schematically illustrate embodiments of the editor 10, the parser 30, and the actuator 40.

With reference to FIG. 2A, the editor 10 includes a database 11, an editing interface 12, and an editing module 13.

The database 11 is used to store interface elements. The interface elements include elements that will be presented on the editing interface 12 and can receive user inputs. The interface elements, for example, include elements such as borders, colors, symbols, values, and the like.

The editing interface 12 includes four sub-interfaces, i.e., a first sub-interface 121, a second sub-interface 122, a third sub-interface 123, and a fourth sub-interface 124.

In some examples, interface elements presented on the editing interface 12 can be touch-sensitive, not touch-sensitive, or controlled by voice or hand gestures.

In the example of elements that are touch-sensitive, those elements are capable of understanding finger gestures and actions such as touching, tapping, sliding, touching with handwriting, or combinations thereof.

In the example of elements that are not touch-sensitive, those elements can receive an input signal from another device such as a mouse or keyboard. For example, an icon on the editing interface 12 that is not touch-sensitive can be selected by receiving a mouse click.

In the example of elements that are controlled by voice, the user can read out an interface element presented on the editing interface 12 to select that interface element.

The editing module 13 edits the user inputs into a rule script according to a pre-defined expression rule and a predetermined format. The rule script having the predetermined format is transmitted to the storage unit and stored in the storage unit.

With reference to FIG. 2B, the parser 30 includes an acquiring module 31, a parsing module 32, and a management module 33. The acquiring module 31 acquires the rule script from the storage unit 20. The parsing module 32 converts the acquired rule script into an expression configured to run on operating system of the infotainment system, such as the AAOS and then inputs the expression into the management module 33. The management module 33 creates the list of monitoring elements and the list of functional elements according to the expression.

With reference to FIG. 2C, the actuator 40 includes a monitoring module 41 and a triggering module 42. The monitoring elements created in the management module 33 are registered into the monitoring module 41 so that the monitoring module 41 monitors corresponding sensor detection information. The monitoring module 41 determines whether the trigger condition is satisfied based on the sensor detection information. In an example, if the trigger condition is satisfied, the triggering module 42 triggers the management module 33 to make a response, and then the triggering module 42 triggers a corresponding vehicle function to realize the user-defined rule. In another example, if the trigger condition is satisfied, the triggering module 42 triggers the corresponding vehicle function directly without triggering the management module 33 to make a response.

It is noted that the editor 10, the parser 30 and the actuator 40 can be implemented by means of hardware or software or a combination of hardware and software, including code stored in a non-transitory computer-readable medium and implemented as instructions executed by a processor. Regarding implementation by means of hardware, it may be implemented in an application-specific integrated circuit (ASIC), a digital signal processor (DSP), a data signal processing device (DSPD), a programmable logic device (PLD), a field programmable gate array (FPGA), a processor, a controller, microcontroller, a microprocessor, an electronic unit, or a combination thereof. The implementation by software may include microcode, program code or code segments. The software may be stored in a machine-readable storage medium, such as a memory.

It is noted that the editor 10, parser 30 and actuator 40 are named based on their functions, and their physical forms or arrangements are not limited by their names.

Figure 3:
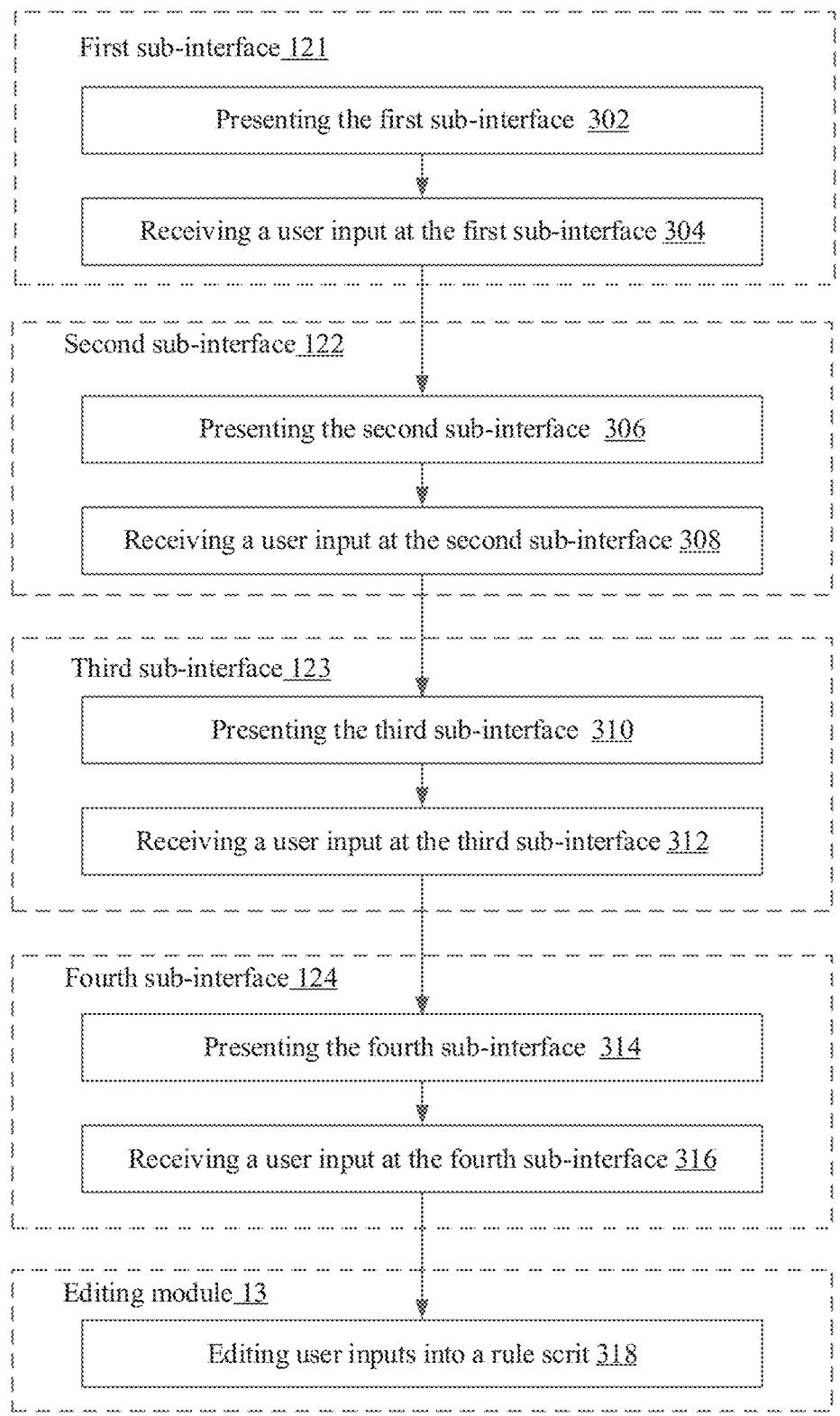
FIG. 3 is a flowchart of an editing process according to an embodiment of the disclosure.

FIG. 3 shows an editing process 300 according to an embodiment of the disclosure. This editing process 300 can be implemented by the editor 10.

In an example, an initialization process (not shown) can be performed before performing the process 300. For example, an APP in which the editor 10 is disposed is activated in the initialization process.

Figure 5A:
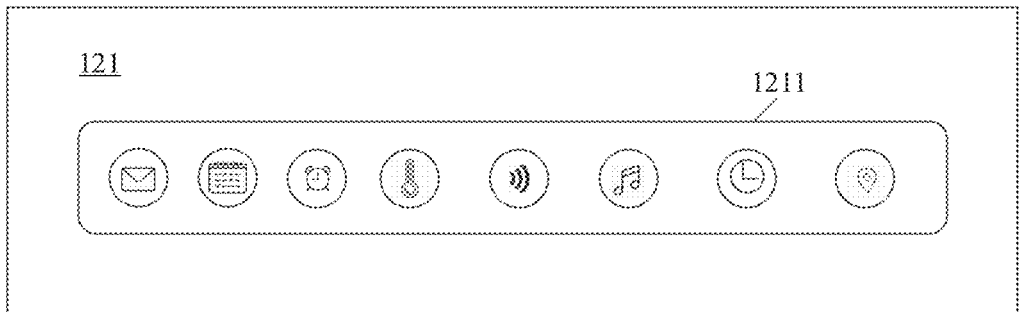
FIGS. 5A-5D are schematic diagrams of sub-interfaces according to an embodiment of the disclosure.

With reference to FIG. 3, at block 302, a first sub-interface 121 is presented on the editing interface 12. With reference to FIG. 5A, the first sub-interface 121 includes a status element window 1211 in which one or more status elements are presented. Those status elements can be implemented by means of one or more visual programming components encapsulated by the AAOS. In the status element window 1211, one of the one or more status elements is selected by receiving a user input. For example, the user selects a status element of humidity by touching the status element of humidity.

Each status element represents a class of status. In some examples, the status elements include one or more of the following elements: time, location, alarm time, email, ambient temperature, cabin temperature, calendar, Bluetooth, instant message, IoT device (e.g., a smart home device, a wearable device, or a road-side unit), vehicle status information (e.g., vehicle speed, vehicle acceleration/deceleration, energy consumption, or remaining range), and environmental status information (e.g., rainfall, brightness, visibility, or wind speed).

At block 304, a first user input is received via the first sub-interface 121 such that the user selects one of the status elements. For example, the user touches a status element on the first sub-interface 121 to select that status element, or the user reads out a status element on the first sub-interface 121 to select that status element.

At block 306, the second sub-interface 122 is presented on the editing interface 12 in response to the user selection.

Figure 5B:
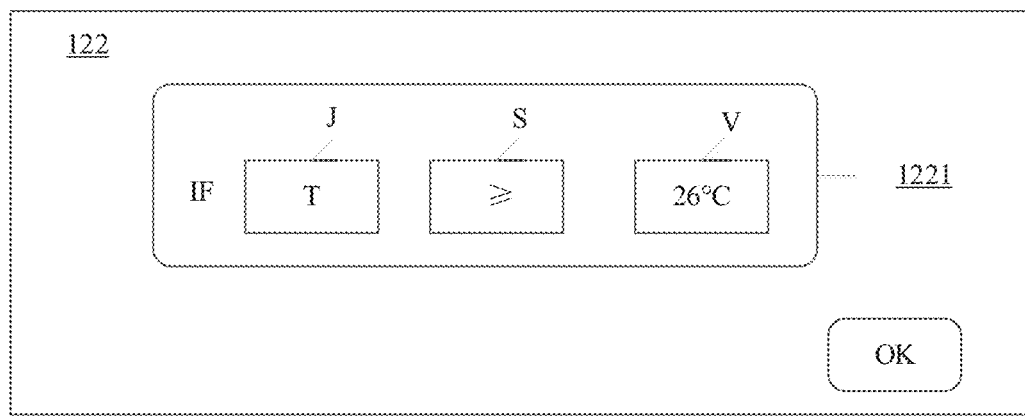

With reference to FIG. 5B, the second sub-interface 122 includes a condition setting window 1221. The condition setting window 1221 includes interface elements for setting the trigger condition. For example, the interface elements for setting the trigger condition include an element J for setting a judgment condition, an equation symbol S for setting an equality or inequity expression and an element V for setting a threshold value. The equation symbol includes a selection of "greater than", "equal to", "less than," "greater than," "less than or equal to", "greater than or equal to", "not equal to," "inclusive" and "exclusive" listed in a drop-down menu of the element S for user selection. The user can select a condition from the drop-down menu of element J as the specific judgment condition, such as temperature and select "greater than or equal to" as the equation symbol. The threshold value is a value corresponding to the selected status element. For example, the threshold value corresponding to a status element of temperature is a temperature value such as 10° C.

At block 308, a second user input is received at the second sub-interface 122 so that the user sets the trigger condition. For example, user inputs are received at the elements J, S and V, thereby completing the setting of the trigger condition. For example, a user input of "T" is received at element J, "" is received at the element S, another user input of "26° C." is received at the element T, and a trigger condition of "if an ambient temperature being greater than 26° C." is completed.

The second sub-interface 122 can also include an "OK" button. When the "OK" button receives a user input, it indicates the setting of the trigger condition has been completed, and subsequent operations will be performed.

Figure 5C:
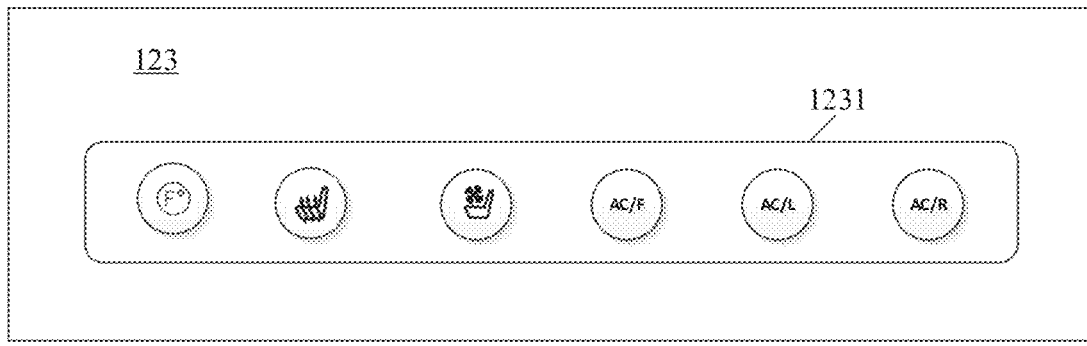

At block 310, the third sub-interface 123 is presented on the editing interface 12. Referring to FIG. 5C, the third sub-interface 123 includes an operation element window 1231. The operation element window 1231 includes one or more operation elements. The one or more operation elements are implemented by means of one or more visual programming components encapsulated by the AAOS. The user can select one of the operation elements by touching or reading out said operation element.

Each operation element represents a class of vehicle operation/function. In some examples, the operation elements include one or more of the following elements: turning on interior or exterior lighting, turning on air conditioning, locking vehicle doors and windows, controlling the vehicle speed, adjusting the rearview mirror, adjusting the seat position, changing the display on HUD (head-up display) or dashboard, starting navigation, connecting to an IoT device, playing multimedia, and activating lane centering.

At block 312, a third user input is received at the third sub-interface 123 for selecting an operation element. For example, the user selects an operation element on the third sub-interface 123 by touching or reading out that operation element.

Figure 5D:
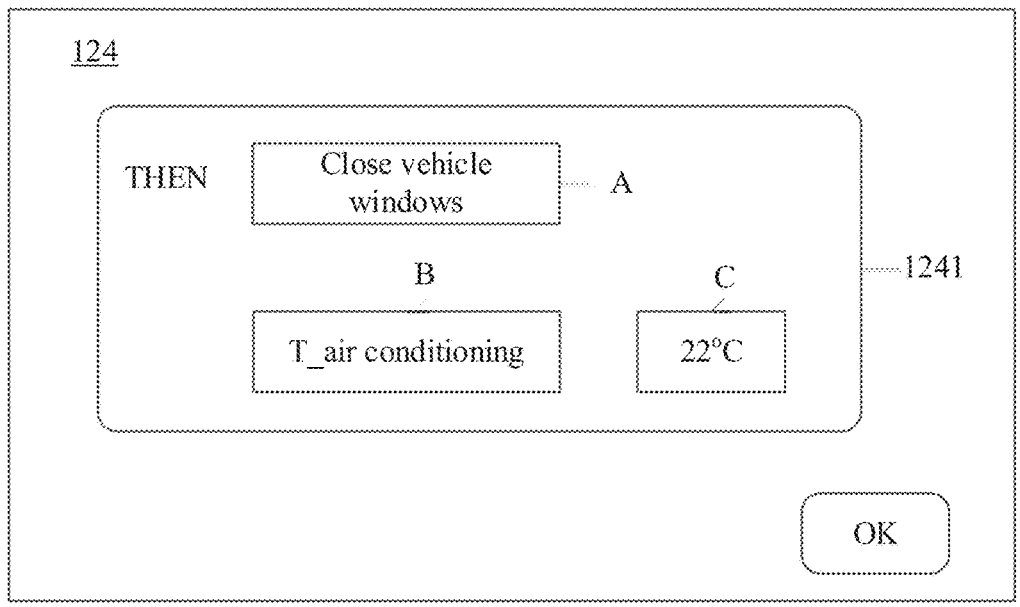

At block 314, the fourth sub-interface 124 is presented on the editing interface 12. With reference to FIG. 5D, the fourth sub-interface 124 includes an operation setting window 1241. The operation setting window 1241 includes one or more interface elements, for example, interface elements A-C.

At block 316, a fourth user input is received at the fourth sub-interface 124 for setting the vehicle operation. For example, the user input to element A is "closing vehicle windows", the user input to element B is "setting the air conditioning", and the user input to element C is "22° C.".

The fourth sub-interface 124 also includes an "OK" button. When the "OK" button receives a user input, it indicates the setting of the vehicle operation has been completed, and subsequent operations will be performed.

It is noted that the user interacts with interface elements on the sub-interfaces in sequence. For example, when the user interaction on the first sub-interface is completed, the user is directed to the second sub-interface. Only when the user interaction on the second sub-interface is completed is the user directed to the third sub-interface. After the user interaction with interface elements on the third sub-interface is complete, the user can navigate to the fourth sub-interface.

It is noted that interface elements presented on each of the sub-interfaces and how they are configured on the sub-interface can be personalized and flexibly adjusted. For example, one or more interface elements on a sub-interface can be hidden, added, or deleted, and the configuration, such as position, color or size of the one or more interface elements can be changed.

At block 318, the editing module 13 edits the user inputs into a rule script using a predetermined expression rule, for example, a regular expression rule.

In some examples, the predetermined expression rule includes an expression consisting of one or more meta-characters and custom characters. The expression supports nested functions and recursive functions. The one or more meta-characters include operators and factors. The operators and factors are predefined in the editing module. The one or more custom characters can be defined by the user.

The operators include one or more of "IF", "THEN", "ELSE", "AND", "OR", and "NOT". The factors include one or more visual programming components encapsulated by the AAOS. In some examples, the factors include visual programming components of "Status", "Action", and "Preset (e.g., Pre-process)".

The custom characters include characters input by the user and expression names such as names of other pre-defined expressions.

In some examples, the editing module 13 converts the rule script into text information with a predetermined format for transmission.

The predetermined format includes three portions, i.e., a first portion and a second portion having the same prefixed data length, and a third portion having a variable data length. The length of both the first and second portions is 32 bits. The length of the third portion is variable. The length information of the third portion is recited in a field of "Data Packet Length". The length of third portion (i.e., a data portion) is in a range from 0 to 65535 (i.e., 2^16-1).

The first portion includes two or more fields. For example, the first portion sequentially includes a header having a length of 8 bits, an editor version having a length of 8 bits, an AAOS version having a length of 8 bits, and an identification having a length of 8 bits.

The second portion includes two or more fields. For example, the second portion sequentially includes a data packet having a length of 16 bits and a reservation having a length of 16 bits.

The third portion includes a data portion having a variable length.

Definitions and examples of the predetermined format for the expression are described in the tables below. Table 1 illustrates an exemplary format of the expression. Table 2 illustrates an exemplary format of the data portion of the expression in Table 1. Tables 3-9 illustrate exemplary formats of sub-portions of the data portion in Table 1. Table 3 illustrates an exemplary format of the beginning portion of the expression. Table 4 illustrates an exemplary format of the ending portion of the expression. Table 5 illustrates an exemplary format of operators of the expression. Table 6 illustrates an exemplary format of names of the expression, which can be defined by the user. Table 7 illustrates an exemplary format of preset operations of the expression, which can be defined by the user. Table 8 illustrates an exemplary format of trigger conditions of the expression, which can be defined by the user. Table 9 illustrates an exemplary format of actions of the expression, which can be defined by the user. The values in parentheses in the tables below are numbers of bits.

TABLE 1

Exemplary Format of the Expression

Head (8)　　Editor Version (8)　AAOS Version (8)　Identification (8)
Data Packet length (16)　　　　　　　Reservation (16)
Data (0-65535)

TABLE 2

Exemplary Format of the Data Portion

Type (4)　　　Data length (12)　　　Reservation (16)
Data (0~4095)

TABLE 3

Exemplary Format of Beginning Portion of the Expression

0x0　　　　Data length (12)　　　Reservation (16)

TABLE 4

Exemplary Format of Ending Portion of the Expression

0xF　　　　Data length (12)　　　Reservation (16)

TABLE 5

Exemplary Format of the Operator

0x1　　　　Data length (12)　　　Operator Type (16)

Examples of the Operator Type:

| | |
|---|---|
| 0x0001 | IF |
| 0x0002 | THEN |
| 0x0003 | AND |
| 0x0004 | OR |
| 0x0005 | NOT |
| 0x0006 . . . 0xFFFF | Reserved |

TABLE 6

Exemplary Format of Expression Name

0x2　　　　Data length (12)　　　Reservation (16)
Expression Name (0~4095)

TABLE 7

Exemplary Format of Preset

| 0x3 | Data length (12) | Reservation (16) |
|---|---|---|
| | Preset Name (0~4095) | |

TABLE 8

Exemplary Format of the Trigger Condition

| 0x4 | Data length (12) | | Reservation (16) |
|---|---|---|---|
| Element ID (8) | Status ID (8) | Judgment Condition (8) | Value (8) |
| Supplementary content (could be null) | | | |

Examples of the Judgment Condition:

| | |
|---|---|
| 0x01 | Greater |
| 0x02 | Great than or equal |
| 0x03 | Less than |
| 0x04 | Less than or equal |
| 0x05 | Equal |
| 0x06 | Unequal |
| 0x07 | Inclusive |
| 0x08 | Exclusive |
| 0x09 ... 0xFF | Reserved |

TABLE 9

Exemplary Format of the Action

| 0x5 | Data length (12) | | Reservation (16) |
|---|---|---|---|
| Element ID (8) | Action ID (8) | Operation (8) | Value (8) |
| Supplementary content (could be null) | | | |

Figure 4:
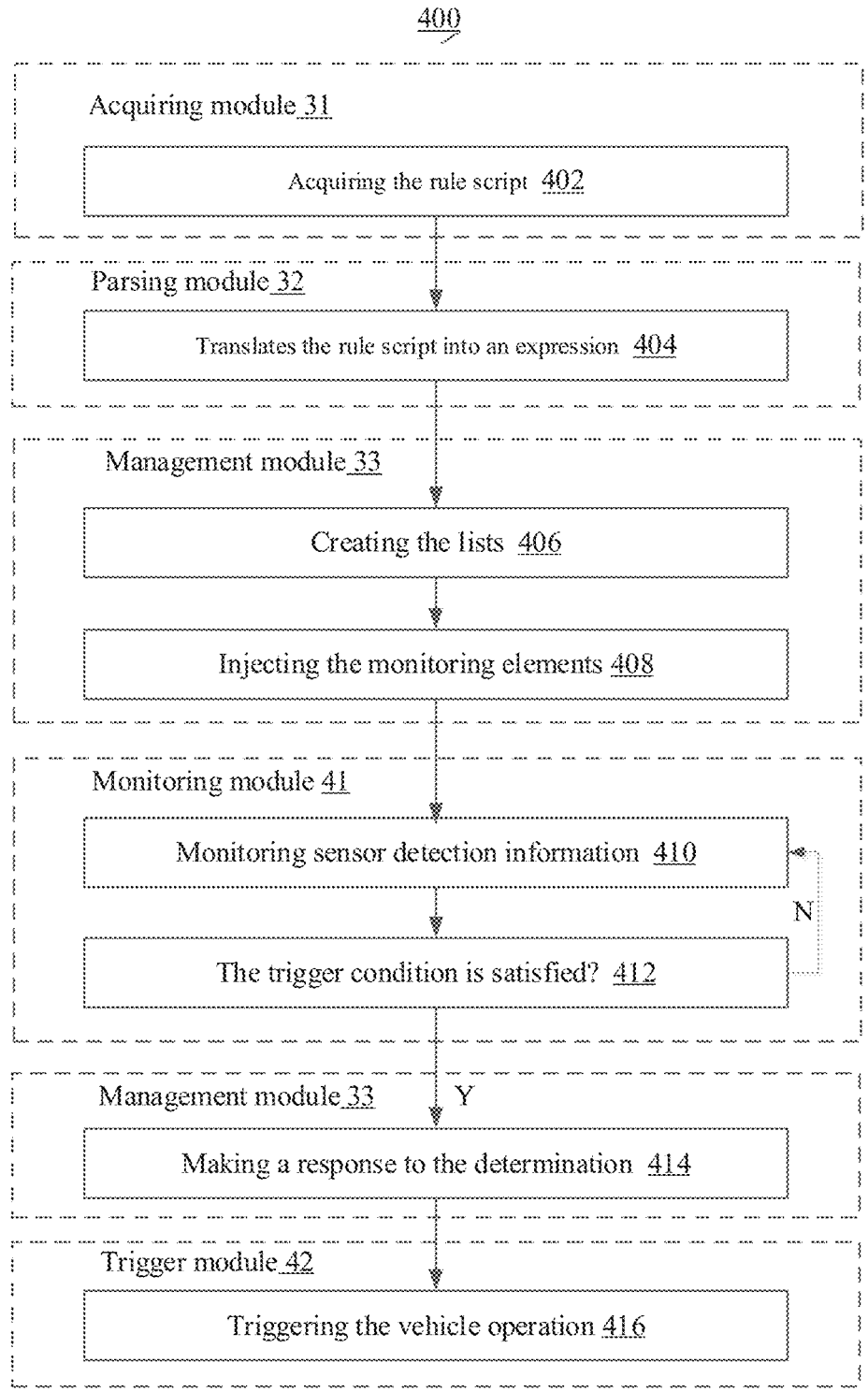
FIG. 4 is a flowchart of a parsing and execution process according to an embodiment of the disclosure.

FIG. 4 illustrates a parsing and execution process 400 according to an embodiment of the disclosure. This process 400 can be implemented by the parser 30 and the actuator 40.

Before performing the process 400, the rule script having the predetermined format is stored in the storage unit 20. Then, the parser 30 is notified that there is an update in the storage unit 20.

With reference to FIG. 4, at block 402, the acquiring module 31 acquires the edited rule script having the predetermined format from the storage unit 20.

At block 404, the parsing module 32 translates the rule script into an expression that can run on the AAOS.

At block 406, the management module 33 creates a list of monitoring elements and a list of functional elements based on the expression. The list of monitoring elements includes sensor elements that directly or indirectly sensing the user-defined trigger condition. The list of functional element includes functional elements associated with the user-defined vehicle operation.

At block 408, the management module 33 inputs the monitoring elements into the monitoring module 41.

At block 410, the monitoring module 41 monitors sensor detection information.

At block 412, the monitoring module 41 determines whether the user-defined trigger condition is satisfied based on the sensor detection information.

If it is determined that the trigger condition is not satisfied, the process 400 turns back to block 410 and continues to monitor the sensor detection information.

If it is determined that the trigger condition is satisfied, the process 400 proceeds to block 414. At block 414, the management module 33 makes a response to the determination of the trigger condition being satisfied.

At block 416, the trigger module 42 triggers the vehicle operation so that the user-defined rule is executed.

For clarity, an example of blocks 412-416 is described with an example of "monitoring an ambient temperature and performing operations of closing vehicle windows and turning on the air conditioning." In this example, the monitoring module 41 determines whether the user-defined condition is satisfied, i.e., the module 41 determines whether the ambient temperature detected by an environmental sensor is equal to or greater than 26° C. If it is the ambient temperature is below 26° C., the monitoring module 41 continues to monitor the ambient temperature. If it is determined the ambient temperature is equal to or greater than 26° C., the management module 33 makes a response. Then, in response to the response of the management module 33, the trigger module 42 triggers a vehicle operation of closing vehicle windows and turning on the air conditioning.

Figure 6:
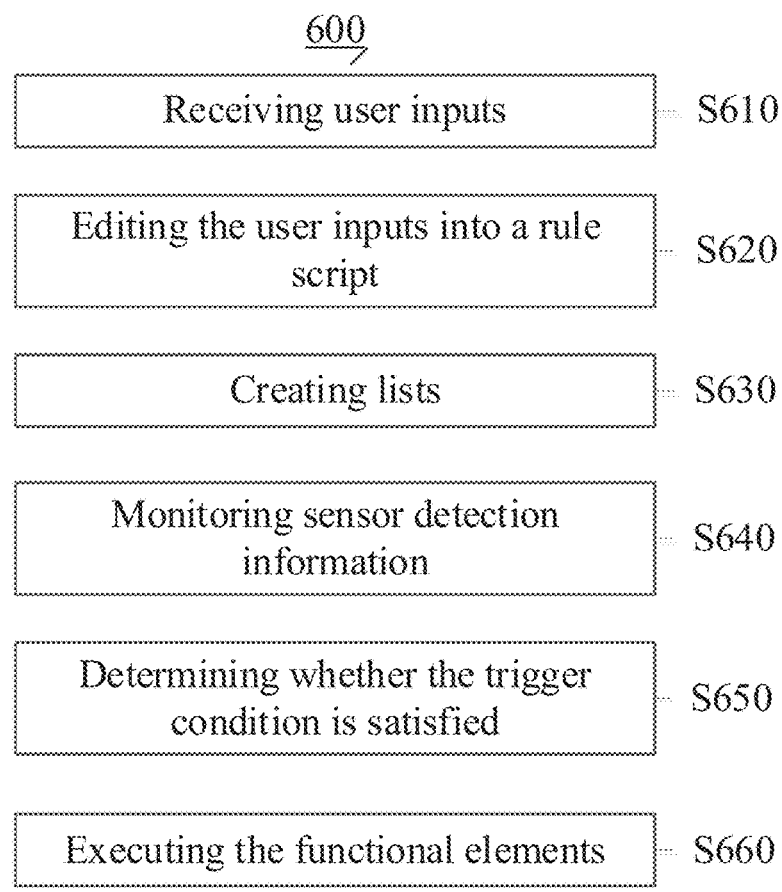
FIG. 6 is a flowchart of a vehicle-user interaction method according to an embodiment of the present disclosure.

FIG. 6 shows a flowchart of a vehicle-user interaction method 600 according to an embodiment of present disclosure. The method can be executed by the system 100. Therefore, the above descriptions about the system 100 are also applicable here.

Referring to FIG. 6, in step S610, one or more inputs are received from a user of the vehicle at the editor 10.

In step S620, the one or more inputs are edited into a rule script at the editor. The rule script includes a user-defined rule based on the one or more inputs. The user-defined rule has a trigger condition and a vehicle operation performed when the trigger condition is satisfied.

In step S630, a list of monitoring elements and a list of functional elements are created at the parser 30 based on the rule script. The list of monitoring elements includes sensor elements that directly or indirectly sense the trigger condition. The list of functional elements includes functional elements that are associated with the vehicle operation.

In step S640, sensor detection information associated with the sensor elements is monitored at the actuator 40.

In Step S650, it is determined whether the trigger condition is satisfied at the actuator based on the monitored sensor detection information.

In Step S660, if it is determined the trigger condition is satisfied, the functional elements are executed at the actuator 40, to implement the user-defined rule in the vehicle.

The disclosure provides a non-transitory computer-readable medium with instructions stored therein which, when executed, causes a processor to carry out the steps of the method 600 described above.

It is noted that all the operations in the method and process described above are merely exemplary, and the disclosure is not limited to any operations in the method or sequence orders of these operations, and should cover all other equivalents under the same or similar concepts.

The processors can be implemented using electronic hardware, computer software, or any combination thereof. Whether these processors are implemented as hardware or software will depend on the specific application and the overall design constraints imposed on the system. By way of example, a processor, any portion of a processor, or any combination of processors presented in this disclosure may be implemented as a microprocessor, a micro-controller, a digital signal processor (DSP), a field programmable gate array (FPGA), a programmable logic device (PLD), a state machine, a gate logic, a discrete hardware circuitry, and other suitable processing components configured to perform the various functions described in this disclosure. The functions of a processor, any portion of a processor, or any combination of processors presented in this disclosure may be implemented as software executed by a microprocessor, a micro-controller, a DSP, or other suitable platforms.

Software should be interpreted broadly to represent instructions, instruction sets, code, code segments, program code, programs, subroutines, software modules, applications, software applications, software packages, routines, subroutines, objects, running threads, processes, functions, and the like. Software can reside on a non-transitory computer-readable medium. Such non-transitory computer-readable medium may include, for example, a memory, which may be, for example, a magnetic storage device (e.g., a hard disk, a floppy disk, a magnetic strip), an optical disk, a smart card, a flash memory device, a random access memory (RAM), a read only memory (ROM), a programmable ROM (PROM), an erasable PROM (EPROM), an electrically erasable PROM (EEPROM), a register, or a removable disk. Although a memory is shown as being separate from the processor in various aspects presented in this disclosure, a memory may also be internal to the processor (e.g., a cache or a register).

The previous description is provided to enable any person skilled in the art to implement the various aspects described herein. Various modifications to these aspects will be readily apparent to those skilled in the art, and the general principles defined herein may be applied to other aspects. Thus, the claims are not intended to be limited to the aspects shown herein. All structural and functional equivalent transformations to the elements of the various aspects of the disclosure, which are known or to be apparent to those skilled in the art, are intended to be covered by the claims.

What is claimed is:

1. A vehicle-user interaction system for a vehicle, comprising:
   an editor configured to receive one or more inputs from a user of the vehicle and edit the one or more inputs into a rule script, the rule script comprising a user-defined rule based on the one or more inputs, the user-defined rule defining a trigger condition and a vehicle operation performed when the trigger condition is satisfied;
   a parser configured to create a list of monitoring elements and a list of functional elements based on the rule script, the list of monitoring elements comprising sensor elements that directly or indirectly sense the trigger condition, and the list of functional elements comprising functional elements that are associated with the vehicle operation; and
   an actuator configured to monitor sensor detection information associated with the sensor elements, determine whether the trigger condition is satisfied based on the monitored sensor detection information, and execute the functional elements to implement the user-defined rule in the vehicle if it is determined the trigger condition is satisfied;
   wherein the editor comprises an editing module configured to edit the one or more inputs according to a regular expression rule and a predetermined format to generate the rule script;
   wherein the predetermined format comprises first and second portions each having a fixed data length, and a third portion having a variable data length; and
   wherein the first portion sequentially includes a header having a length of 8 bits, an editor version having a length of 8 bits, an infotainment operating system version having a length of 8 bits, and an identification having a length of 8 bits, the second portion sequentially includes a data packet having a length of 16 bits and a reserved field having a length of 16 bits, and the third portion comprises a data field having a variable length.

2. The vehicle-user interaction system of claim 1, wherein the editor comprises an editing interface on which a first sub-interface, a second sub-interface, a third sub-interface, and a fourth sub-interface are presented sequentially; and
   wherein the first sub-interface comprises a status element window in which one or more status elements are presented, the one or more status elements being implemented by means of one or more visual programming components that are encapsulated by an operating system of the vehicle;
   the second sub-interface comprises a condition setting window in which one or more interface elements are presented for the user to set the trigger condition;
   the third sub-interface comprises an operation element window in which one or more operation elements are presented, the one or more operation elements being implemented by means of one or more visual programming components that are encapsulated by the operating system; and
   the fourth sub-interface comprises an operation setting window in which one or more interface elements are presented for the user to set the vehicle operation.

3. The vehicle-user interaction system of claim 2, wherein the one or more inputs comprise:
   a first input to the first sub-interface so that one of the one or more status elements can be selected by the user;
   a second input to the second sub-interface so that the trigger condition can be defined by the user,
   a third input to the third sub-interface so that one of the functional elements can be selected by the user; and
   a fourth input to the fourth sub-interface so that the vehicle operation can be defined by the user.

4. The vehicle-user interaction system of claim 1, wherein the trigger condition comprises a judging condition, an equation symbol, and a threshold value.

5. The vehicle-user interaction system of claim 1, wherein the vehicle-user interaction system further comprises a storage unit disposed in the vehicle, the rule script is stored in the storage unit upon it has been edited in the editor, and wherein the parser acquires the rule script from the storage unit before creating the list of monitoring elements and the list of functional elements.

6. The vehicle-user interaction system of claim 1, wherein the editor is provided in an electronic device, or in an on-board system of the vehicle, or in both of the electronic device and the on-board system;
   wherein the parser is provided in the on-board system of the vehicle; and
   wherein the actuator is provided in the on-board system of the vehicle.

7. The vehicle-user interaction system of claim 1, wherein the editor, the parser, and the actuator are all provided in an infotainment system of the vehicle; and
   wherein an operating system of the infotainment system is Android Automotive Operation System (AAOS).

8. The vehicle-user interaction system of claim 1, wherein the editor includes two or more editors provided in an infotainment system of the vehicle and an electronic device of the user such that the rule script is programmed on an APP, a web page, and an on-board unit (OBU).

9. A vehicle-user interaction method for a vehicle, comprising:
   receiving, at an editor, one or more inputs from a user of the vehicle;

editing, at the editor, the one or more inputs into a rule script, the rule script comprising a user-defined rule based on the one or more inputs, the user-defined rule defining a trigger condition and a vehicle operation performed when the trigger condition is satisfied;
creating, at a parser and based on the rule script, a list of monitoring elements and a list of functional elements, the list of monitoring elements comprising sensor elements that directly or indirectly sensing the trigger condition, and the list of functional elements comprising functional elements that are associated with the vehicle operation;
monitoring, at an actuator, sensor detection information associated with the sensor elements;
determining, at the actuator and based on the monitored sensor detection information, whether the trigger condition is satisfied; and
executing, at the actuator, the functional elements to implement the user-defined rule in the vehicle if it is determined the trigger condition is satisfied;
wherein editing the one or more inputs comprises: editing the one or more inputs according to a regular expression rule and a predetermined format to generate the rule script;
wherein the predetermined format comprises a first portion and a second portion each having a fixed data length, and a third portion having a variable data length; and
wherein the first portion sequentially includes a header having a length of 8 bits, an editor version having a length of 8 bits, an operating system version having a length of 8 bits, and an identification having a length of 8 bits, the second portion sequentially includes a data packet having a length of 16 bits and a reserved field having a length of 16 bits, and the third portion comprises a data field having a variable length.

10. The vehicle-user interaction method of claim 9, further comprises:

presenting a first sub-interface, a second sub-interface, a third sub-interface, and a fourth sub-interface on the editing interface sequentially at an editing interface of the editor.

11. The vehicle-user interaction method of claim 10, wherein presenting the first sub-interface comprises presenting a status element window having one or more status elements, the one or more status elements being implemented by means of one or more visual programming components that are encapsulated by an operating system of the vehicle.

12. The vehicle-user interaction method of claim 10, wherein presenting the second sub-interface comprises presenting a condition setting window having one or more interface elements for the user to set the trigger condition.

13. The vehicle-user interaction method of claim 10, wherein presenting the third sub-interface comprises presenting an operation element window having one or more operation elements, the one or more operation elements being implemented by means of one or more visual programming components that are encapsulated by an operating system of the vehicle.

14. The vehicle-user interaction method of claim 10, wherein presenting the fourth sub-interface comprises presenting an operation setting window having one or more interface elements for the user to set the vehicle operation.

15. The vehicle-user interaction system of claim 10, wherein receiving the one or more inputs comprises:
receiving the one or more input from the first, second, third, and fourth sub-interfaces sequentially.

16. The vehicle-user interaction method of claim 9, wherein the method further comprises:
storing the edited rule script in a storage unit; and
acquiring, at the parser, the rule script from the storage unit before creating the list of monitoring elements and the list of functional elements.

* * * * *